United States Patent
Vukojevic et al.

(10) Patent No.: US 10,369,461 B2
(45) Date of Patent: Aug. 6, 2019

(54) CLOUD GAMING SYSTEM AND METHOD OF INITIATING A GAMING SESSION

(71) Applicant: Nvidia Corporation, Santa Clara, CA (US)

(72) Inventors: Bojan Vukojevic, Santa Clara, CA (US); Darrin D'Mello, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 1198 days.

(21) Appl. No.: 14/163,178

(22) Filed: Jan. 24, 2014

(65) Prior Publication Data

US 2015/0209662 A1    Jul. 30, 2015

(51) Int. Cl.
| | | |
|---|---|---|
| A63F 13/30 | (2014.01) | |
| A63F 13/358 | (2014.01) | |
| A63F 13/335 | (2014.01) | |
| H04L 29/08 | (2006.01) | |
| A63F 13/33 | (2014.01) | |
| A63F 3/08 | (2006.01) | |

(52) U.S. Cl.
CPC ............ *A63F 13/12* (2013.01); *A63F 13/335* (2014.09); *A63F 13/358* (2014.09); *H04L 67/141* (2013.01); *H04L 67/28* (2013.01); *A63F 13/33* (2014.09); *A63F 2003/088* (2013.01); *A63F 2300/407* (2013.01); *H04L 67/02* (2013.01); *H04L 67/22* (2013.01)

(58) Field of Classification Search
CPC ...... G06F 17/32; G06F 17/3223; G06F 17/34; H04L 63/0281; H04L 63/0428; H04L 63/166; H04L 63/20; H04L 63/168; H04L 63/1416; H04L 63/0823; H04L 67/141; H04L 67/28; H04L 67/22; H04L 67/02; A63F 13/12; A63F 13/335; A63F 9/24; A63F 13/358; A63F 13/33; A63F 2300/407; A63F 2003/088
USPC ....... 463/42, 25, 20; 713/152; 709/203, 227; 726/23, 12
See application file for complete search history.

(56) References Cited

U.S. PATENT DOCUMENTS

| | | | |
|---|---|---|---|
| 6,377,257 B1 | 4/2002 | Borrel et al. | |
| 2006/0217201 A1* | 9/2006 | Berstis | G07F 17/32 463/42 |
| 2009/0181772 A1* | 7/2009 | Hargreaves | G07F 17/32 463/42 |

(Continued)

OTHER PUBLICATIONS

Eric Zhang, "Reverse Proxy DDoS Protection", Dec. 19, 2013.*
Art Stricek, "A Reverse Proxy is a Proxy by Any Other Name", Jan. 10, 2002.*

*Primary Examiner* — Jungwon Chang
(74) *Attorney, Agent, or Firm* — Kevin Brown; Parker Justiss, P.C.

(57) ABSTRACT

A gaming cloud gaming system and a method of initiating a gaming session. One embodiment of the gaming cloud gaming system includes a computing system having: (1) an entry point operable to receive a game session request and generate instructions for establishing a connection between a client and a game server, and (2) a dynamically configurable reverse proxy operable to proxy for the game server and configured to employ the instructions to create a route to a randomly selected port on the game server through which the connection is makeable.

7 Claims, 2 Drawing Sheets

(56) References Cited

U.S. PATENT DOCUMENTS

| | | | |
|---|---|---|---|
| 2010/0071052 A1* | 3/2010 | Mao | H04L 63/0823 726/12 |
| 2010/0197405 A1* | 8/2010 | Douceur | A63F 13/12 463/42 |
| 2012/0129591 A1* | 5/2012 | Jahanshahi | G07F 17/32 463/25 |
| 2013/0282789 A1* | 10/2013 | Langworthy | H04L 67/1095 709/203 |
| 2014/0274291 A1* | 9/2014 | Elias | G07F 17/34 463/20 |
| 2014/0337614 A1* | 11/2014 | Kelson | H04L 63/168 713/152 |
| 2015/0013006 A1* | 1/2015 | Shulman | H04L 63/1416 726/23 |

* cited by examiner

CLOUD GAMING SYSTEM AND METHOD OF INITIATING A GAMING SESSION

TECHNICAL FIELD

This application is directed, in general, to gaming cloud gaming systems and, more specifically, to use of reverse proxies in gaming cloud gaming.

BACKGROUND

The primary purpose of a proxy service is to act on behalf of another system, generally either one or more clients, or one or more servers. A forward proxy provides proxy services to one or more clients. When a client desires access to the Internet, it submits a request through the forward proxy, which can allow or deny the request. When allowing the request, the forward proxy passes the request along to a server over the Internet. When the server responds to the request, it responds to the forward proxy, which recognizes the response as directed to the requesting client. The forward proxy is a single point of access and control, which makes it well-suited to enforce security policies on the clients behind the forward proxy.

Similarly, a reverse proxy provides proxy services to one or more servers. When a client desires access to a server, the request is submitted to the reverse proxy, which accepts requests on behalf of the servers behind it. The reverse proxy then passes the request to the appropriate server and ultimately responds to the client as if the response is from the server itself. The reverse proxy hides the identity of the servers behind it, making it also well suited to provide security.

A proxy service is generally a process executing on a computing system that sits on the network over which it proxies. A computing system hosting the proxy process is sometimes referred to as a proxy device. For reverse proxies, the proxy service can execute on one of the server computing systems for which it serves as proxy, in addition to whatever processes the server ordinarily runs.

SUMMARY

One aspect provides a computing system. In one embodiment, the system includes: (1) an entry point operable to receive a game session request and generate instructions for establishing a connection between a client and a game server, and (2) a dynamically configurable reverse proxy operable to proxy for the game server and configured to employ the instructions to create a route to a randomly selected port on the game server through which the connection is makeable (i.e. able to be made).

Another aspect provides a method of initiating a gaming session. In one embodiment, the method includes: (1) receiving a gaming session request originating at a client and assigning a dynamically configurable reverse proxy having an Internet protocol (IP) address, (2) selecting a game server and at least one port thereon for the gaming session, and (3) transmitting the at least one port and the IP address toward the client.

Yet another aspect provides a gaming cloud gaming system. In one embodiment, the system includes: (1) a plurality of game servers configured to host gaming sessions for a plurality of clients, wherein the gaming sessions respectively employ at least one network connection with a game server of the plurality, (2) a plurality of reverse proxy nodes dynamically configurable to proxy for the plurality of game servers and having respective IP addresses, and (3) a provision manager operable to: (3a) receive a request for a gaming session from a client of the plurality, (3b) assign a reverse proxy node of the plurality to the gaming session and cause the reverse proxy node to randomly select respective ports for the at least one network connection, and (3c) communicate the respective IP address of the reverse proxy node and the respective ports to the client and the respective ports to the game server.

BRIEF DESCRIPTION

Reference is now made to the following descriptions taken in conjunction with the accompanying drawings, in which.

DETAILED DESCRIPTION

Figure 1:
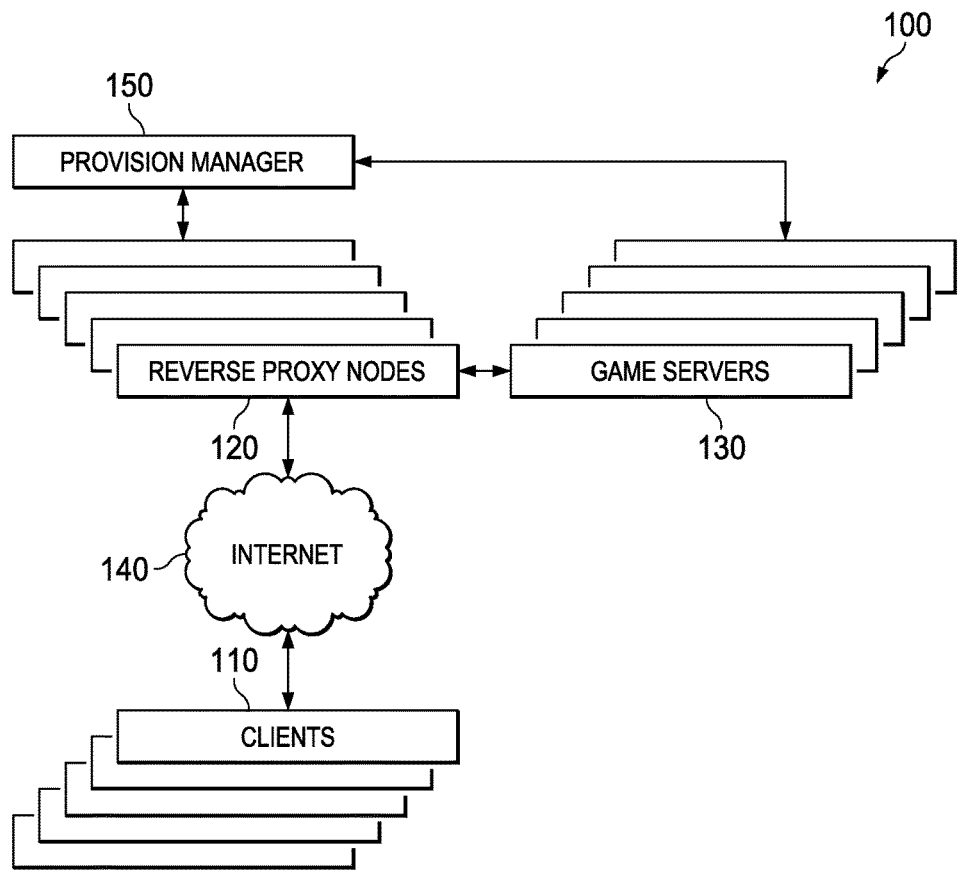
FIG. 1 is a block diagram of one embodiment of a gaming cloud gaming system.

Cloud gaming is a service wherein a client initiates a gaming session with a game server and a connection is negotiated between the client and the game server. The game server executes the appropriate game application and renders the graphics. Rendered graphics are streamed to the client in real-time over the connection, and user inputs are streamed from the client to the game server in real-time.

A gaming cloud gaming service provider typically employs many servers capable of providing gaming cloud gaming streams to many clients. Each server typically requires a unique public Internet protocol (IP) address, which introduces significant cost and security implications. Each server is essentially the same and can host any gaming cloud gaming session that any other can host. The gaming cloud gaming system typically exposes a single end-point with statically configured routes to a server. The statically configured routes employ the same port values among each of the servers. As gaming session requests are received from clients, the end-point directs the requests to the appropriate port for that particular service and to a server with available bandwidth.

It is realized herein that gaming cloud gaming systems can use dynamically configured reverse proxies to create and break routes dynamically as demand for gaming sessions and connections fluctuates. A gaming session request arrives at a provision manager, which then instructs a reverse proxy to set up connections to a game server. The provision manager is the entry point that is always available to clients through the Internet. The provision manager monitors the capacity of the gaming cloud gaming system and, as realized herein, can bring reverse proxy nodes online and offline to meet demand. An instructed reverse proxy node then randomly assigns as many ports as are necessary for the gaming session. ("Random" is defined broadly to include true random, pseudorandom and quasirandom.)

Dynamic port allocations allow various games having different demands to be efficiently allocated to game servers of varying capability. "Dynamic" refers to configuring processes on-demand for a particular gaming session between a particular client and a particular server. When the gaming session ends, the processes drop the configuration, thereby closing any associated connections. The processes then either terminate or are reconfigured for another gaming session. The dynamically configurable proxies effectively form a software defined network (SDN) such that, under zero load, no game servers are reachable through the reverse proxy. Conversely, static routes can introduce latency issues because of the varying performance of the game servers running various game applications. Static routes require large numbers of open ports on the game servers to support the variety of bandwidth demands. Each of the game servers uses the same port values for certain games, certain processes, or certain connections. It is realized herein that static routes result in unbalanced loads on the game servers. By dynamically adding and removing routes, the load on the game servers can be more intelligently distributed among the game servers.

It is further realized herein that the ports should only remain open for the duration of the gaming session. Once the gaming session ends, the used ports are closed through the reverse proxy. Each new session gets one or more randomly selected ports and potentially a different server. This makes it difficult to attack the game servers, because no connection is persistent. Additionally, it is realized herein that, the reverse proxy should examine packets and only pass those that originate from the appropriate source IP address, which would be the IP address for the game server or the client.

Once the provision manager assigns the gaming session to a particular reverse proxy node and a game server, and the routes are established, the provision manager then responds to the initial gaming session request from the client, instructing it to use the connections, which are identified by an IP address for the reverse proxy and port numbers. To establish a connection, the reverse proxy evaluates rules to route the initial packets. The rules are essentially a configuration of a network address translation (NAT) process, such as IPTables. A (NAT) process routes packets. The reverse proxy uses the rules dynamically to instruct the NAT process how to route packets based on its instructions from the provision manager.

It is realized herein that the NAT process can be configured such that packet processing can be completed in logarithmic time. Initial packets that create new connections to game servers through the reverse proxy are routed by the NAT process. Certain NAT processes utilize a binary tree, or "B-Tree," rule structure wherein the leaf nodes contain the actual NAT rules that determine the NAT fate of a packet. It is realized herein that branches can be made based on whether a packet's associated destination port lies within a configurable defined range. Once packets have been initially routed, the NAT process tracks the connection internally and routes subsequent packets over that connection automatically in constant time.

It is realized herein that the time needed to route a packet tends to be constant among all sessions, all servers, and all ports. The constant allows a non-degraded real-time gaming cloud gaming service.

It is also realized herein that such a gaming cloud gaming system can gain fault tolerance by having multiple dynamically configurable reverse proxy processes. If a connection is disrupted or a reverse proxy process faults, the provision manager can bring another reverse proxy process online, new ports are assigned, and the connection between the game server and the client is reestablished through the new reverse proxy.

FIG. 1 is a block diagram of one embodiment of a gaming cloud gaming system, system 100. System 100 includes clients 110, reverse proxy nodes 120, game servers 130, a provision manager 150. Provision manager 150, reverse proxy nodes 120, and game servers 130 constitute "the gaming cloud" as far as clients 110 are concerned. Clients 110 gain access to the gaming cloud through the Internet 140. Clients 110 can include a variety of computing devices, including: desktop personal computers (PCs), laptop PCs, handheld game devices, mobile phones, Smartphones, tablet computers, and others. Clients 110 generally need the capability to transmit and receive game data from the gaming cloud through the Internet 140. Clients 110 are also capable of displaying graphics rendered on the gaming cloud and streamed to them.

Game servers 130 are responsible for executing game applications and rendering game graphics. Game servers 130 typically include many server computers to provide the game streams to connecting clients. Reverse proxy nodes 120 proxy for game servers 130. Reverse proxy nodes 120 also allow the distribution of gaming sessions among game servers 130 according to available processing bandwidth. Reverse proxy nodes 120 are typically individual proxy processes executing on one or more computers on the gaming cloud network. Reverse proxy nodes 120 are brought online and offline according to demand from clients 110. Reverse proxy nodes 120 have their own IP addresses and prevent direct access to game servers 130 from the Internet 140. Packetized game data originating at clients 110 are received by reverse proxy nodes 120 over the Internet 140. The packets use the IP addresses of reverse proxy nodes 120 as the destination address. Reverse proxy nodes 120 then route the game data to the appropriate server for each gaming session of clients 110. Similarly, game data originating at game servers 130 are transmitted to reverse proxy nodes 120, where the packets are then routed toward the appropriate clients.

Provision manager 150 is a persistent process executing on a computer on the gaming cloud network. Clients 110 generate gaming session requests to initiate gaming sessions. Provision manager 150 is configured to receive the gaming session requests via reverse proxy nodes 120 and coordinate the various elements of the gaming cloud to establish the necessary connections for each gaming session. Provision manager 150 determines which of game servers 130 should host a given gaming session and assigns a node of reverse proxy nodes 120. The hosting game server determines what connections are needed for the gaming session. For example, one game session may require three user datagram protocol (UDP) connections and four transmission control protocol (TCP) connections. Each different game application may use different combinations of connections. Game servers 130 pass the connection needs back to provision manager 150. Provision manager 150 instructs the assigned reverse proxy node to add the necessary routes for those connections. Reverse proxy nodes 120 are configured to randomly select port values to use for their respective gaming sessions. Those ports are then opened on the assigned reverse proxy node. The selected ports are then communicated back to provision manager 150 and to game servers 130. Provision manager 150 then communicates the connection instructions through reverse proxy nodes 120 to clients 110. The connection instructions for a given client include the IP address for the assigned reverse proxy node and the randomly selected port values. Additionally, connection instructions can also include the quantity and type of connections for a given gaming session. Clients 110 then use the connection information to establish connections to game servers 130 through the Internet 140 and reverse proxy nodes 120.

Figure 2:
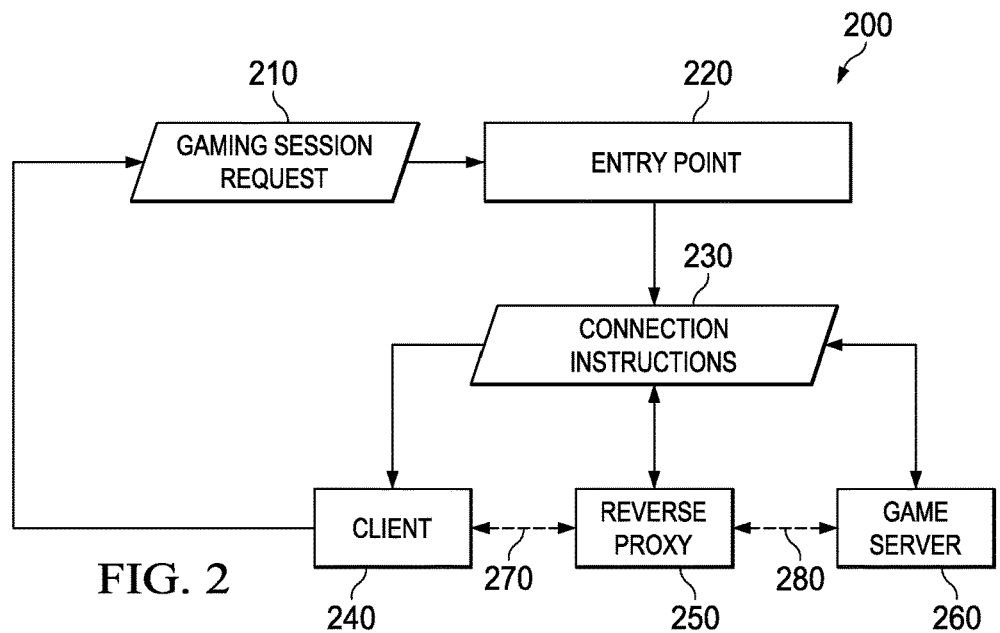
FIG. 2 is a block diagram of another embodiment of a gaming cloud gaming system.

FIG. 2 is a block diagram of another embodiment of a gaming cloud gaming system, system 200. System 200 includes an entry point 220, a client 240, a reverse proxy 250, and a game server 260. Client 240 initiates a game session by submitting a gaming session request 210 to entry point 220. Gaming session request 210 includes connection details for client 240 and identifies the particular game for which the session is request.

Entry point 220 receives gaming session request 210 and generates connection instructions 230. Entry point 220 is a persistent process that manages the allocation of gaming cloud resources, particularly the number of reverse proxy nodes and the distribution of gaming sessions among all game servers.

Game server 260 is one server, typically of many, responsible for executing game applications and rendering graphics to be streamed to one or more clients for their respective gaming sessions. Game server 260 uses connection instructions 230 to determine what connections are necessary for the requested gaming session. The quantity and types of connections are added to connection instructions 230.

Reverse proxy 250 is a dynamically configurable proxy for game server 260. Reverse proxy 250 uses connection instructions 230 randomly to select ports for the necessary connections to game server 260. The randomly selected ports are also added to connection instructions 230.

Client 240 is a computing device capable of at least displaying remotely rendered graphics and transmitting and receiving game data to and from game server 260. Client 240 uses connection instructions 230, including the IP address of reverse proxy 250, the randomly selected ports, and the quantity and types of connections, to establish the necessary connections to game server 260 through reverse proxy 250. Client 240 transmits initial packets for the necessary connections to reverse proxy 250 over proxy connections 270. Proxy connections 270 include the quantity and types of connections deemed necessary by game server 260 in response to connection instructions and gaming session request 210. The initial packets from client 240 are processed by reverse proxy 250 to establish routes 280 to game server 260. Routes 280 include a route for each connection to its designated port on game server 260. The initial packets for each connection are identifiable by their originating IP address, which is that of client 240, the IP address of reverse proxy 250, and the destination port on game server 260.

Reverse proxy 250 employs a binary-tree rule structure to carry out NAT. NAT is generally an independent process configured by reverse proxy 250. In certain embodiments, reverse proxy 250 employs a separate binary tree for TCP and UDP connections. A packet begins processing at the root of the binary tree and moves down the branches toward leaf nodes. In the binary tree, the leaf nodes contain NAT rules for determining the NAT fate of a packet. The branches are made based on whether the destination port of a packet falls within a configurable range for the branch, eventually arriving at a leaf node for a particular port on game server 260. Once the route is established by processing the initial packets through the binary tree, the route is tracked internal to the NAT process and subsequent packets associated with the connection are routed automatically. This proxy routing provides for a determinable worst-case routing time, which can then be used to determine whether additional reverse proxy nodes should be brought online or if existing reverse proxy nodes can be taken offline. Additionally, the routing time is held constant among all clients, servers, and reverse proxy nodes.

When the gaming session terminates, whether voluntarily by client 240 or by broken connections in proxy connection 270 or routes 280, the ports randomly selected by reverse proxy 250 are closed and the routes removed between reverse proxy 250 and game server 260. If client 240 were to initiate a new gaming session or if entry point 220 were to initiate a recovery of an involuntary termination of proxy connections 270 or routes 280, entry point 220 would generate new connection instructions to a different reverse proxy node and possibly a different game server. The new reverse proxy node would randomly select new ports to be used for the gaming session. Client 240 would then use the new connection instructions to reestablish its connections to the game server.

Figure 3:
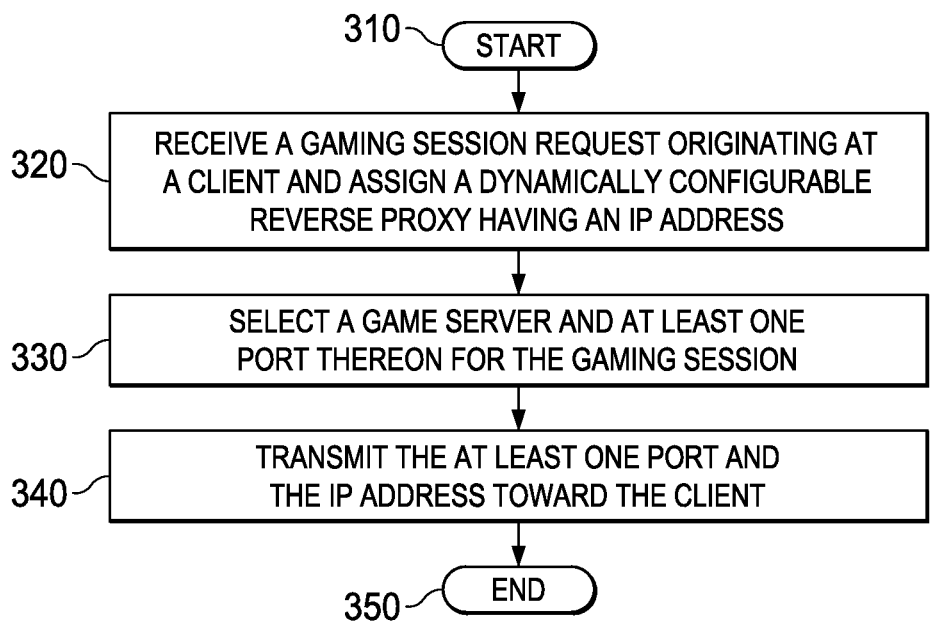
FIG. 3 is a flow diagram of one embodiment of a method of initiating a gaming session.

FIG. 3 is a flow diagram of a method for initiating a gaming session. The method begins in a start step 310. A gaming session is initiated by a client request. In a receiving step 320, the gaming session request is received and a dynamically configurable reverse proxy is assigned to the gaming session. The reverse proxy has an IP address and proxies for at least one game server. A particular game server and at least one port on that game server are selected in a selection step 330. The assigned reverse proxy forms a route from the reverse proxy node to the selected port on the game server. Additionally, given the selected port value, NAT rules can be formed for routing the initial packets of a particular connection.

Continuing the embodiment of FIG. 3, in a communication step 340, the at least one port value selected in selection step 330 and the IP address of the dynamically configurable reverse proxy are transmitted back to the originating client. The client uses this information to establish at least one connection with the game server through the dynamically configurable reverse proxy. The client transmits the initial packets for the connections to the reverse proxy, which uses a NAT process to carry out the initial routing. There are a variety of NAT schemes available, e.g., IPTables, for routing the initial packets. In certain embodiments the NAT process employs a binary-tree rule structure based on the destination port for each of the initial packets. A binary-tree structure based on the port value allows for packet routing in logarithmic time.

Ultimately, the gaming session will terminate. A gaming session can end in a variety of ways, the most basic of which is the client simply voluntarily ending the session. Alternatively, a gaming session may be involuntarily ended in the event of a connection interruption or a process fault or failure in the game server or one of its proxies. Upon termination of the gaming session, any routes added for that gaming session are removed and the associated ports closed on the reverse proxy node. The method then ends in an end step 350.

Those skilled in the art to which this application relates will appreciate that other and further additions, deletions, substitutions and modifications may be made to the described embodiments.

What is claimed is:
1. A cloud gaming system, comprising:
a plurality of game servers configured to host gaming sessions for a plurality of clients, wherein:
said gaming sessions respectively employ at least one network connection with a game server of said plurality; and
said plurality of game servers execute an appropriate game application for
said gaming sessions, render graphics for said game application, and stream said rendered graphics to said clients in real time over said at least one network connection, wherein said plurality of game servers do not act as any of said plurality of clients;

a plurality of reverse proxy nodes dynamically configurable to proxy for said plurality of game servers and having respective Internet protocol (IP) addresses; and a provision manager operable to:

receive a request for a gaming session from a client of said plurality of clients, assign a reverse proxy node of said plurality of reverse proxy nodes to said gaming session and cause said reverse proxy node to randomly select respective ports for said at least one network connection, and communicate the respective IP address of said reverse proxy node and said respective ports to said client and said respective ports to said game server.

2. The cloud gaming system as recited in claim 1 wherein said reverse proxy node is configured to close said at least one network connection between said game server and said client upon termination of said gaming session.

3. The cloud gaming system as recited in claim 1 wherein said plurality of reverse proxy nodes are configured to employ a binary-tree network address translation (NAT) scheme to route initial packets of said at least, one network connection from said plurality of clients, wherein said binary-tree NAT scheme branches based on respective destination ports of said initial packets.

4. The cloud gaming system as recited in claim 3 wherein the routing time for a packet is constant for all packets transmitted among said plurality of clients, said plurality of game servers, and said plurality of reverse proxy nodes.

5. The cloud gaming system as recited in claim 1 wherein said at least one network connection includes a user datagram protocol (UDP) connection.

6. The cloud gaming system as recited in claim 1 wherein said provision manager is further operable to assign another reverse proxy node to said gaming session and establish at least one new network connection if said at least one network connection fails.

7. The cloud gaming system as recited in claim 1 wherein said provision manager is configured to add reverse proxy nodes to said plurality of reverse proxy nodes if the number of clients in said plurality of clients indicates demand for gaming sessions is near the capacity of said plurality of reverse proxy nodes.

* * * * *